Oct. 18, 1966   H. F. COOK   3,279,688
CENTRIFUGE

Filed Aug. 3, 1964   3 Sheets-Sheet 1

Oct. 18, 1966   H. F. COOK   3,279,688
CENTRIFUGE
Filed Aug. 3, 1964   3 Sheets-Sheet 2
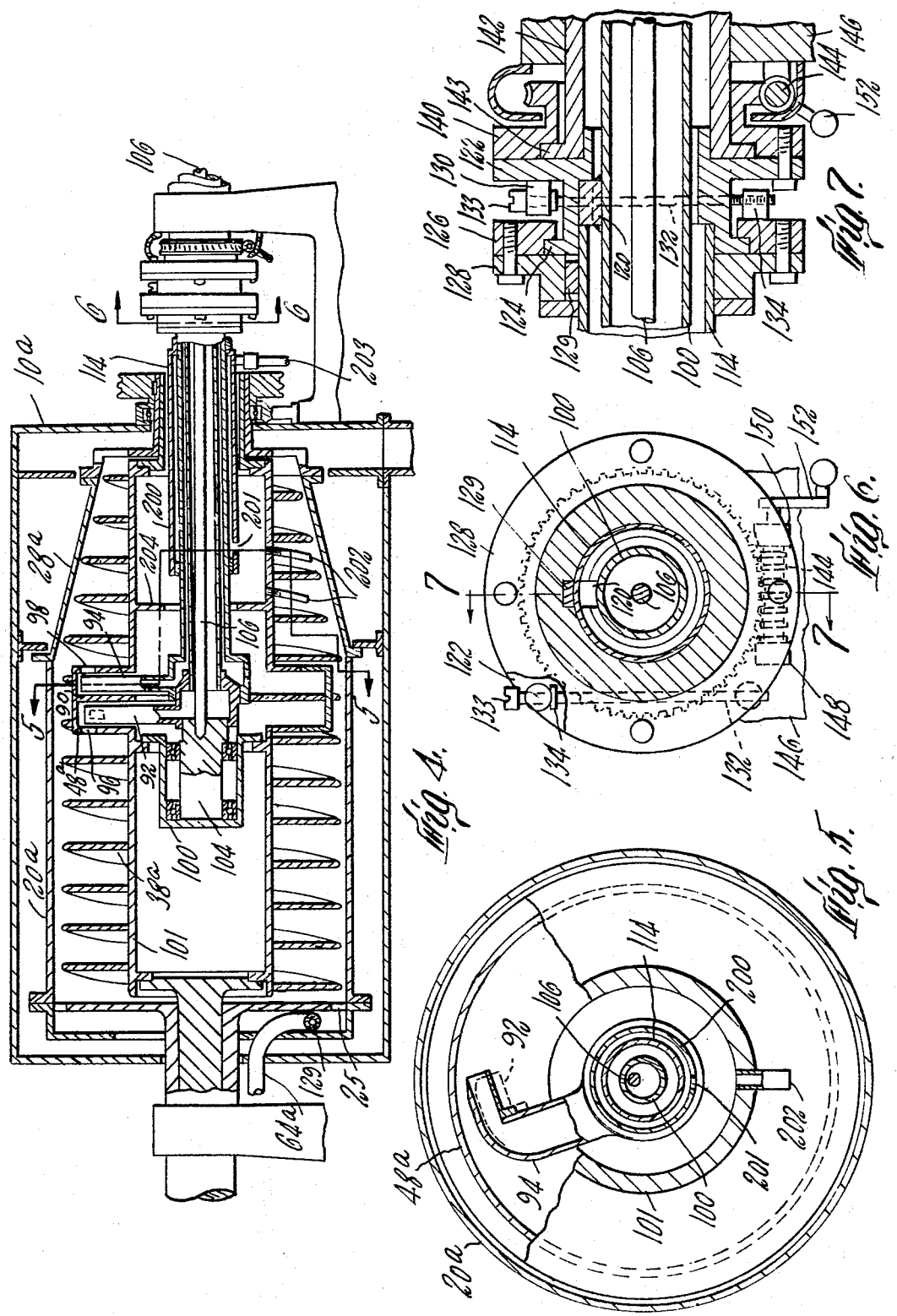

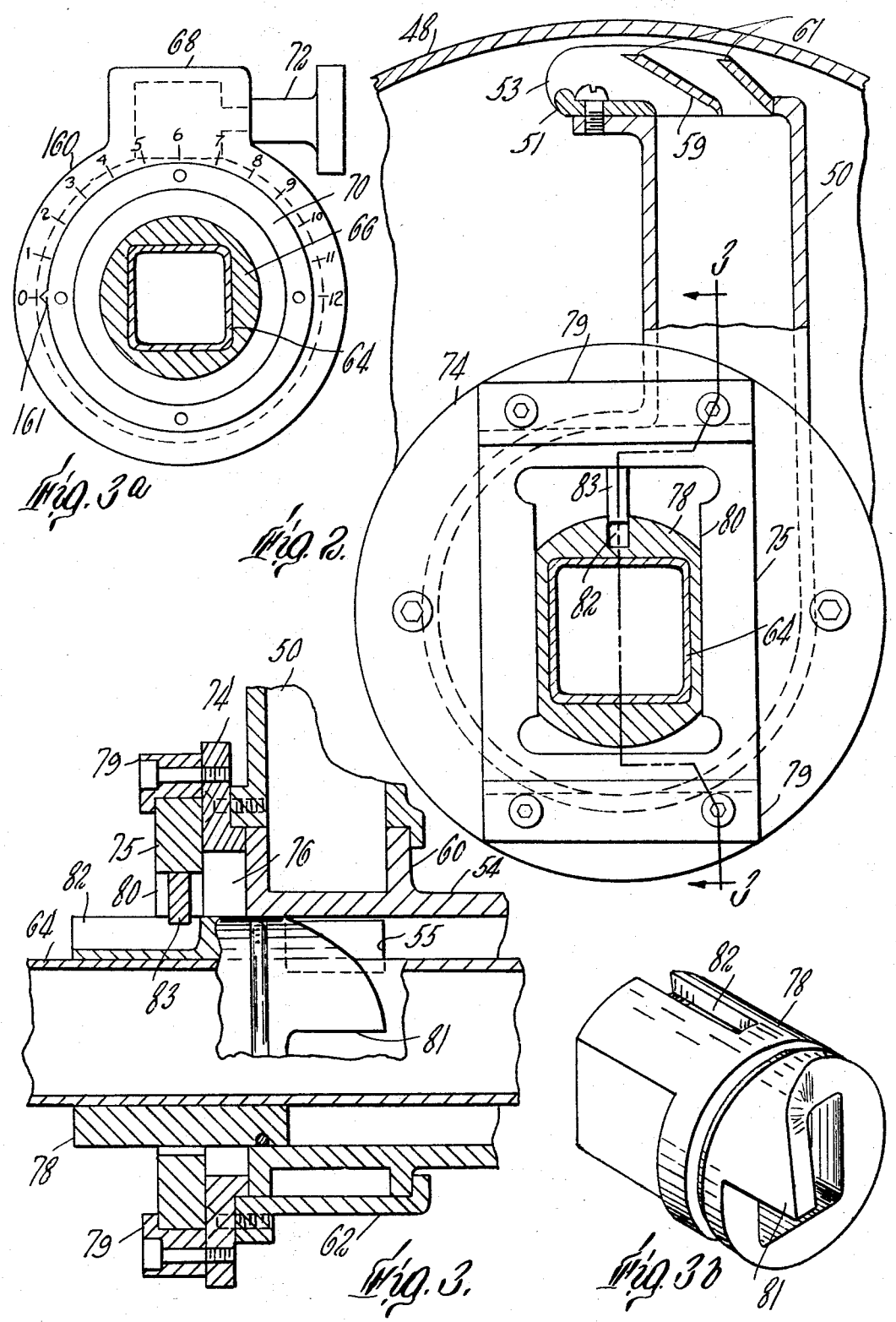

United States Patent Office 3,279,688
Patented Oct. 18, 1966

3,279,688
CENTRIFUGE
Horace F. Cook, Foxboro, Mass., assignor to Bird Machine Company, South Walpole, Mass., a corporation of Massachusetts
Filed Aug. 3, 1964, Ser. No. 386,943
8 Claims. (Cl. 233—7)

This invention relates to a solid bowl centrifugal separator for separating liquid from finely divided solids, and in particular to an improved construction for such a separator in which one or more liquid discharge conduits are located in a radially adjustable manner within the bowl.

It has proven to be highly advantageous in the operation of a solid bowl centrifugal separator to be able to adjust with very great accuracy the level of liquid retained in the bowl without having to shut down the separator. One way of making such adjustment possible is by the provision of a liquid discharge conduit or skimmer extending outwardly from the bowl's axis of rotation, the radial position of which can be changed while the separator is running.

In some separators, especially those in which the flow of solids and liquid is concurrent along the inner face of the bowl, it is also important to locate the discharge conduit at the interior of the bowl, within the axial travel of the solids conveyer. The problem is thus created of supporting a normally stationary conduit deep within a bowl and conveyer rotating at high machine speed, and yet making the conduit subject to positional control from outside the bowl during the operation of the machine. Prior to the present invention this problem remains unsolved, and all effluent conduits involving any feature of positional adjustment were located near the ends of the separator.

It is therefore an object of the invention to provide means for supporting one or more liquid discharge conduits in a radially adjustable manner at the interior of the bowl of a solid bowl centrifugal separator, said conduits being located within the axial travel of the conveyer.

One way of accomplishing the above object, shown as an alternative embodiment of this invention, involves supporting the conduit by bearings against the rotating conveyer hub. While this embodiment is advantageous in that it allows two conduits to be conveniently supported for independent radial adjustment, it has a drawback in that the bearings must be carefully sealed for most operations to prevent their being fouled by the slurry, and are difficult to maintain. It is therefore another major object of the invention to provide such means for supporting an internal conduit in which neither the conduit nor its supporting members bear against any of the rotating members of the separator. This object is accomplished in the preferred embodiment of the invention by means of a unique cantilevering approach to the problem.

Further objects and advantages of the invention will be apparent upon its detailed description below.

In the drawings:

FIG. 2 is a view in cross-section taken along line 2—2 of FIG. 1;

FIG. 3 is an enlarged view in vertical section partly broken away of a portion of the embodiment of FIGURE 1;

FIG. 3a is a view in vertical section taken along line 3a—3a of FIG. 1;

FIG. 3b is an enlarged perspective view of one portion of the embodiment of FIG. 1;

FIG. 4 is a view in vertical section partly broken away showing another embodiment of the present invention;

FIG. 5 is a view in cross-section taken along line 5—5 of FIG. 4;

FIG. 6 is a view in cross-section taken along line 6—6 of FIG. 4; and

FIG. 7 is a view in section taken along line 7—7 of FIG. 6.

Figure 1:
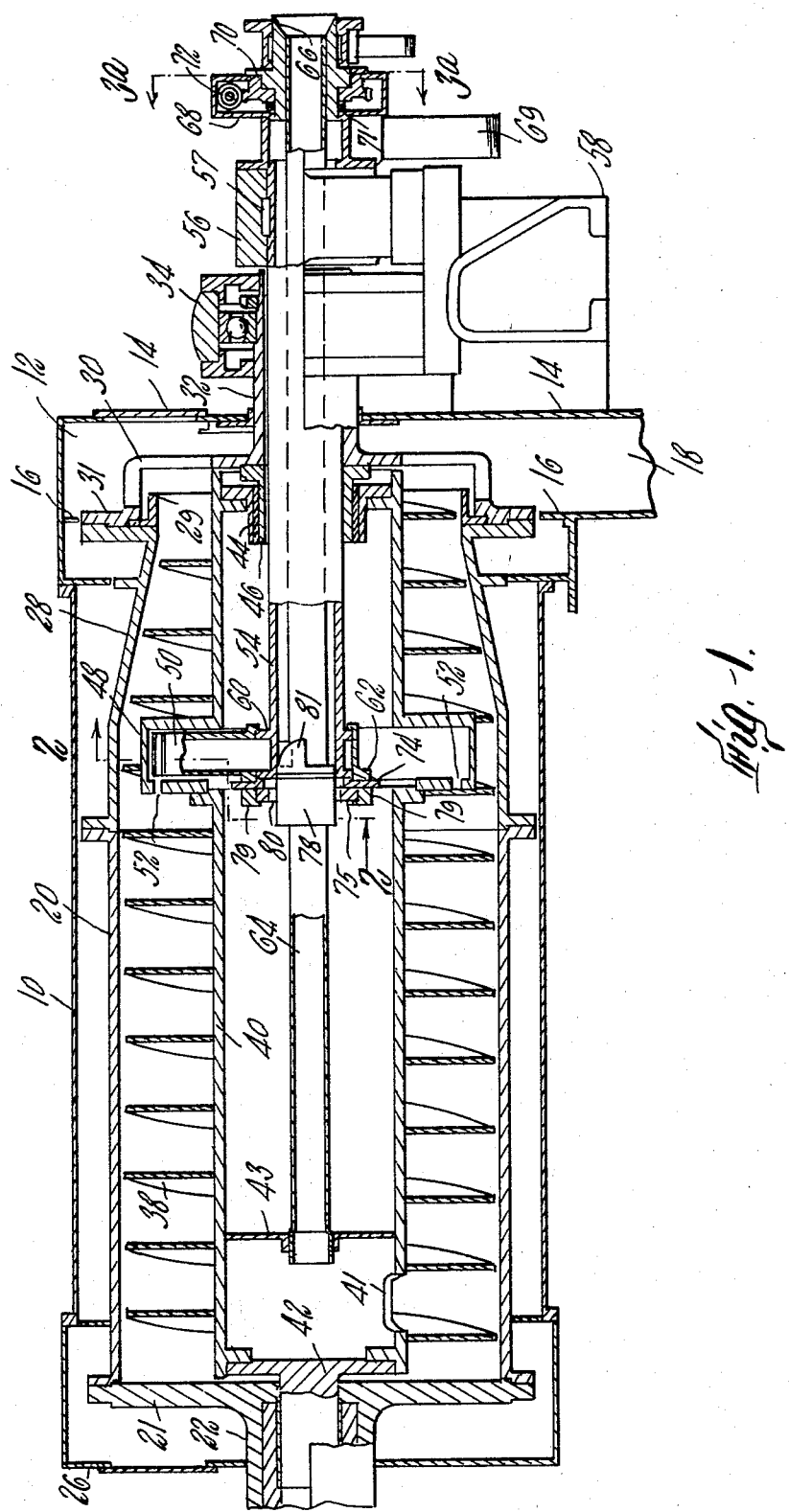
FIG. 1 is a view in vertical section partly broken away of the preferred embodiment of the invention.

As shown in FIG. 1, the preferred embodiment of the invention comprises a generally cylindrical housing 10 having at one end a solids discharge chamber 12 located between the wall 14 and annular baffle 16. An outlet 18 is provided for removing accumulated solid material from the bottom of chamber 12. Mounted for rotation within the housing 10 is a generally cylindrical bowl 20 supported at its left hand end as seen in FIG. 1 by bowl head 21 which includes sleeve shaft 22 journaled in a suitable bearing (not shown) beyond end wall 26 of housing 10. Bowl 20 has at its right hand end as seen in FIG. 1 a slightly conical end portion 28, which eventually opens into solids discharge chamber 12 through spider portion 30 of solids bowl head 31. Disposed at the mouth of bowl end portion 28 is solids weir ring 29. In the embodiment shown, the inner surface of portion 28 just adjacent the bowl mouth, and the inner surface of ring 29, are pitched at a somewhat shallower angle than the main part of portion 28. The right hand end of bowl 20 is supported by solids bowl head 31, including sleeve shaft 32 journaled in bearing assembly 34.

Mounted coaxially within bowl 20 is a helical conveyer 38 which includes a hollow cylindrical drive shaft 40 secured at its left hand end to drive shaft 42 journaled in sleeve shaft 22 and supported at its right hand end on bushing flange 44, in which is journaled solids bowl head extension hub 46. Shafts 22 and 42 are held endwise by suitable thrust bearings (not shown) and interconnected by any suitable gearing (not shown) to rotate at slightly different speeds, e.g., 650 r.p.m. for the bowl and 630 r.p.m. for the conveyer in a manner well known to those skilled in the art, both being driven from any suitable power source (not shown) located to the left of housing end wall 26.

Adjacent the intersection of bowl 20 and conical end portion 28 hollow shaft 40 is provided with a radially outwardly extending generally annular chamber 48 which interrupts all but the peripheral portion of the flights of conveyer 38 and serves as a housing for liquid discharge conduit 50 which extends radially outwardly from adjacent the center of hollow shaft 40 through an opening in the wall thereof. Aperture 52 provides communication between the interior of bowl 20 and chamber 48.

Hollow conduit support shaft 54 extends coaxially within shaft 40, passing through hub 46 and sleeve shaft 32 and out beyond bearing assembly 34. Shaft 54 is nonrotatably supported at its right hand end in a cantilevered manner by pedestal 56, with key 57, and clears the inner surfaces of sleeve shaft 32 and hub 46 on its way into the interior of the bowl. Pedestal 56 and bearing assembly 34 are supported together on base 58, with a similar base structure (not shown) supporting the power assembly at the left of the device. Shaft 54 terminates at its left hand end in an eccentric portion 60, upon which is rotatably mounted a fitting 62 carrying conduit 50, conduit 50 communicating with the interior of shaft 54 through suitable apertures in the wall of shaft 54. Conduit 50 extends radially outward toward the wall of bowl 20 and terminates in a scoop 51 with a scoop opening 53 opposed to the direction of rotation of the bowl and conveyer.

Scoop 51 is preferably constructed as in FIG. 2 with intermediate plate 59 creating a double mouthed opening, with two sharp skimming edges 61.

Extending coaxially within shaft 54 is feed pipe 64, which continues to the left beyond conduit 50 to a point near the end of the bowl and to the right beyond pedestal 56 into sleeve 66. The feed pipe may be round, or square as shown. Gear housing 68 is fixed to the right hand end of pedestal 56 and extends rightward to surround and support sleeve 66. The outer surface of sleeve 66 is generally cylindrical, and it is free to rotate in housing 68. Worm gear 70 is fixed to sleeve 66, with worm bolt 72 fixed to housing 68. Hence, when bolt 72 is turned, sleeve 66 and feed pipe 64 are caused to rotate with respect to fixed shaft 54.

Bolted to the left hand face of fitting 62, but free to rotate with respect to eccentric portion 60, is a circular gib-supporting plate 74 with an enlarged center hole 76. Gibs 79 are in turn mounted on plate 74. Supported between gibs 79 is slide plate 75, having a generally rectangular opening 80. By virtue of this arrangement, slide plate 75 is fixed lengthwise but is free to slide widthwise with respect to plate 74 and conduit fitting 62.

Mounted on feed pipe 64 and extending through openings 76 in plate 74 and 80 in plate 75 is block 78 (shown in enlarged perspective in FIG. 3b). Block 78 is free to rotate in opening 76 but fits tightly widthwise in opening 80. The block can also slide vertically in opening 80. Locating pin 83 fixed in plate 75 extends into groove 82 in block 78. Block 78 is provided with an integral deflecting portion 81, which extends over one quadrant of the circumference of the block, and projects into shaft 54 to deflect and distribute liquid entering said shaft from the conduit, as explained below in greater detail.

By virtue of the entire arrangement just described, when feed pipe 64 is caused, through adjustment of bolt 72, to rotate with respect to shaft 54, block 78, plates 74 and 75, fitting 62 and conduit 50 rotate with pipe 64, thereby changing the circumferential position of conduit 50 on eccentric 60 and, correspondingly, the radial position of scoop opening 53 relative to the wall of bowl 20. The sliding arrangement between plate 74 (and hence the feedpipe fixed widthwise thereto) and the conduit fitting (through gibs 79) is necessitated by the fact that the feed pipe and the conduit do not rotate about a common center.

In operation of the device, the feed mixture of liquid and solid particles is introduced through feed pipe 64 into the interior of spinning conveyer shaft 40. The mixture then passes through aperture 41 in shaft 40 and enters bowl 20 adjacent its left hand end, annular baffle 43 preventing backflow of the feed within shaft 40. Under the influence of centrifugal force the feed forms a layer against the inner wall of the bowl, the solid particles being urged by reason of their high specific gravity to form a layer immediately next to the face of the bowl while the lighter liquid tends to rise toward the center of the bowl. The depth of the liquid layer remains substantially constant so long as the radial position of the mouth of conduit 50 remains contsant and so long as the conduit has the capacity to remove liquid at the rate it is being introduced. Liquid removed from the bowl by conduit 50 passes into shaft 54 through aperture 55 and eventually is discharged through pipe 69 which leads out of housing 68. Deflecting portion 81 of block 78 serves to direct the liquid forwardly along shaft 54, preventing it from following a closed circumferential path along the inner wall of said shaft. O-ring 71 seals housing 68 to sleeve 66, preventing liquid from reaching the worm gear mechanism.

Rotation of conveyer 38 with respect to bowl 20 serves to urge the solid material along the inner wall of the bowl from left to right as seen in FIG. 1. Conduit 50 is made large enough to accommodate the maximum quantity of liquids introduced with the feed mixture. The solid particles, mixed with the remainder of the liquid not removed by conduit 50, flow beyond annular chamber 48, and the solids are urged along the sloping face of conical portion 28 of the bowl, forming a beach. The retained liquid is prevented by centrifugal force from advancing beyond a point on the beach determined by the position of the mouth of conduit 50. Consequently, the solid particles emerge from the liquid and are removed at outlet 18.

The depth of retained liquid against the surface of the bowl can easily be changed while the separator is operating by adjusting the radial position of conduit 50. Hence, the apparatus of the invention is suited to the practice of the method described in the copending application S.N. 366,121 by Amero, in which the pool is raised above the level of the solids at their point of discharge, after a sufficient solids beach has accumulated to prevent the discharge of liquid through weir ring 29. Furthermore, due to the unique manner of cantilevering conduit support shaft 54 from outside the bowl by means of pedestal 56, the need for internal sealed bearings is completely eliminated, greatly simplifying the maintenance of the apparatus.

FIGS. 4–7 illustrate an alternate embodiment of the invention in which two conduits are adjustably located inside the conveyer, and in which internal bearings are used to support the conduits. This embodiment is designed primarily for operations in which the internal atmosphere will not create maintenance problems for the bearings.

As shown in FIG. 4, annular chamber 48a is divided into two portions by a radially inwardly extending annular flange 90 interposed between conduits 92 and 94. Apertures 96 and 98 through the wall of chamber 48a provide communication between the interior of bowl 20a and the respective parts of chamber 48a.

In the operation of the separator, the feed mixture is introduced through inlet pipe 64a, now located to feed circumferentially, and passes into bowl extension or gutter 23, being introduced in the same direction as the direction of rotation of the bowl. The mixture then passes through apertures 25 in bowl head 21a and along the inner face of the spinning bowl. When two different liquids are present, the lighter of the two will form a separate layer closer to the center of the bowl than the other liquid, while the latter, being lighter than the solids, will form a layer between the first liquid layer and the solids layer.

Radial adjustment of the conduits 92 and 94 while the machine is running is provided for as follows:

A cup 100 mounted adjacent the center of rotatable hollow shaft or hub 101 and secured thereto serves as a support for the outer race of bearings 102, 103, the inner races of which support for rotation a fitting 104 carrying at its right-hand end an eccentric 105. Fitting 104 is fixed against rotation by means of a rod 106, one end of which is keyed to fitting 104 and the other end of which extends outwardly beyond the end of housing 10a and is secured in any suitable manner (not shown) externally of the machine. Rotatably mounted upon eccentric 105 is a hollow fitting 108 which carries and communicates with liquid discharge conduit 92. Fitting 108 in turn carries an eccentric 109 at one end and is secured to hollow shaft 110 through which rod 106 extends. Rotatably mounted on eccentric 109 is another fitting 112 having a hollow interior which is in communication with liquid discharge conduit 94 mounted thereon. Fitting 112 is secured to hollow shaft 114 which envelops both rod 106 and hollow shaft 110.

Hollow shaft or pipe 110 is provided (FIGS. 6 and 7) with a key 120 adjacent its outer end which engages with collar 122 having a flange 124 mounted for rotation within a retaining ring 126 bolted to collar 128 which in turn is keyed at 129 to hollow shaft or pipe 114. A stud 130 is secured to collar 122 and is provided with an aperture through which an adjustment bolt 132 passes, the stud being engaged between the head 133 of the bolt and a collar 134 secured to its shank, while the other threaded end of the bolt is engaged in a tapped hole in stud 134 secured to retaining ring 126.

As a result of the foregoing construction, the pipes 110 and 114 may be rotated one with respect to the other along their axes by taking up or backing off on bolt 132 and are held fixed in any desired position by the bolt. This relative rotation varies the position of fitting 112 on eccentric 109, causing the mouth of conduit 94 to move radially inwardly or outwardly with respect to the axis of bowl 20a.

Collar 122 is bolted to ring gear 140 which is mounted for rotation on flange 143 of pipe 142, which forms an extension of pipe 114. Worm 144 is mounted on pedestal 146 by means of brackets 148, 150 in position to mate with ring gear 140 and is provided with crank arm 152.

Manual rotation of crank arm 152 rotates ring gear 140 with respect to fixed pedestal 146 carrying with it both pipe 110 and pipe 114 (which is rotatively fixed with respect to 110 by bolt 132) and associated fittings 108, 112. With rotation of fitting 108 on fixed eccentric 105 causes the mouth of conduit 92 to move radially inwardly or outwardly with respect to the axis of bowl 20a. Since fitting 112 does not rotate with respect to eccentric 109 upon rotation of ring gear 140, the positions of the mouths of conduits 92 and 94 with respect to each other do not change when ring gear 140 is rotated as described above and both conduits move radially inwardly and outwardly together.

Wash inlet pipe 200 envelops both pipes 110 and 114, being fixed to the outside of pipe 114 and having a lateral outlet 201 near its inner end to permit wash liquid to be introduced into the interior of shaft 101 whence it flows through nozzles 202, 202 onto the solids which are being advanced along conical portion 28a. The outer end of wash inlet pipe 200 is connected to a flexible hose 203 through which a supply of water or other liquid may be introduced for washing the solids before they are discharged. Baffle 204 secured to the interior of shaft 101 prevents the wash liquid from flowing directly into annular chamber 48a.

Flange or baffle 90 maintains separation of the two liquids and prevents their remixing as they enter the mouths of conduits 92, 94. Rotation of conveyer 38a with respect to bowl 20a serves to urge the solid material along the inner wall of the bowl from left to right as seen in FIG. 4. The position of the mouth of conduit 94 is adjusted radially by rotating the conduit about eccentric 109 by actuating bolt 132 to maintain the interface between the two liquids at the desired level at the left-hand side of chamber 48a as seen in FIG. 4. Under these conditions chamber 48a acts as a radial baffle to prevent any of the lighter liquid from passing beyond it to reach conduit 94. The position of the mouth of conduit 92 is adjusted radially by rotating the conduit about eccentric 105 by means of crank arm 152 so as to place the mouth radially inwardly of the position of the interface, so that it will remove only lighter liquid.

Scale 160 is shown in FIG. 3a, as part of the preferred embodiment of the invention, although it is, of course, equally applicable to the embodiment of FIGS. 4–7. The scale provides a novel means for obtaining accurate pool level adjustments while the machine is running. The scale itself is fixed to the face of housing 68, with pointer 161 affixed to worm gear 70 and sleeve 66. Hence, the pointer and scale indicate the relative circumferential positions of pipe 64 (fixed to sleeve 66) and shaft 54 (fixed to housing 68), reflecting in turn the relative radial positions of the scoop opening and bowl 20.

While the invention has been described as part of a separator in which the flow of liquid and solid particles is concurrent along the surface of the bowl, it is equally applicable to any other type of solid bowl centrifuge in which a discharge conduit is located inside a rotating member. In all other respects in which specific embodiments of the invention have been described, it is not intended to limit the invention solely thereto, but to include all of the obvious variations and modifications within the spirit and scope of the appended claims.

What is claimed is:
1. A centrifugal separator comprising a rotatable bowl for receiving a mixture of liquid and finely divided solid particles,
   a solids discharge chamber adjacent one end of the bowl in communication with the interior thereof,
   inlet means for introducing said mixture into said bowl, a rotatable conveyer mounted within the bowl coaxially therewith,
   means for rotating the bowl and conveyer at different speeds to cause the solid particles to move along the inner face of the bowl to the solids discharge chamber,
   at least one liquid discharge conduit located inside the bowl and extending outwardly from adjacent the center thereof,
   and means for adjusting the radial position of the conduit with respect to the bowl while the separator is running, comprising an eccentric mounted inside the bowl, said conduit rotatably mounted on said eccentric, and means operable from outside the bowl for rotating said conduit on said eccentric.

2. The separator of claim 1 in which said means for rotating the conduit on the eccentric comprise a pipe in communication with the interior of said conduit and adapted to discharge from the bowl liquid entering the conduit.

3. The separator of claim 1 further comprising means externally located on said separator for indicating the radial position of said conduit.

4. The separator of claim 1 further comprising at least one elongated cantilevered member extending from outside the bowl into the interior thereof without bearing against said conveyer or said bowl, said elongated member adapted to support said conduit in a radially adjustable manner at the interior of the bowl.

5. The separator of claim 1 further comprising a second eccentric mounted inside said bowl, a second conduit rotatably mounted on said second eccentric, and means operable from outside the bowl for rotating said second conduit on said second eccentric to adjust the radial position of said second conduit with respect to the bowl while the separator is running.

6. In a centrifugal separator having a rotatable bowl for receiving a feed mixture of liquid and finely divided solid particles, a rotatable conveyer mounted within the bowl coaxially therewith, and at least one liquid discharge conduit extending outwardly from adjacent the central axis of the bowl,
   the improvement comprising two elongated members extending from outside the bowl into the interior thereof without bearing against said conveyer or said bowl, said elongated members adapted to support said conduit in a radially adjustable manner at the interior of the bowl and to be moved relative to each other to secure said radial adjustment, and means for supporting said elongated members wholly from outside the bowl.

7. In a centrifugal separator having a rotatable bowl for receiving a feed mixture of liquid and finely divided solid particles, a rotatable conveyer mounted within the bowl coaxially therewith, and at least one liquid discharge conduit extending outwardly from adjacent the central axis of the bowl,
   the improvement comprising at least one elongated canilevered member extending from outside the bowl into the interior thereof without bearing against said conveyer or said bowl, said elongated member adapted to support said conduit in a radially adjustable manner at the interior of the bowl, means for adjusting the radial position of said conduit, and means for supporting said elongated member wholly from outside the bowl.

8. A centrifugal separator comprising a rotatable bowl for receiving a mixture of liquid and finely divided solid particles, a solids discharge chamber adjacent one end of the bowl in communication with the interior thereof, inlet means for introducing said mixture into said bowl, a rotatable conveyer mounted within the bowl coaxially therewith, means for rotating the bowl and conveyer at different speeds to cause the solid particles to move along the inner face of the bowl to the solids discharge chamber, first and second liquid discharge conduits located inside the bowl and extending outwardly from adjacent the center thereof, and means operable while the separator is running for adjusting the radial positions of said conduits with respect to the bowl and with respect to each other, comprising a first eccentric mounted inside the bowl, said first conduit rotatably mounted on said first eccentric, a second eccentric fixed to said first conduit, said second conduit rotatably mounted on said second eccentric, means operable from outside the bowl for rotating said first conduit on said first eccentric, and means operable from outside the bowl for rotating said second conduit on said second eccentric.

No references cited.

M. CARY NELSON, *Primary Examiner.*

H. KLINKSIEK, *Examiner.*